United States Patent [19]

Sheldrake

[11] Patent Number: 4,493,001
[45] Date of Patent: Jan. 8, 1985

[54] MOTOR VEHICLE BATTERY RUNDOWN PROTECTION SYSTEM

[75] Inventor: Leonard J. Sheldrake, Noblesville, Ind.

[73] Assignee: General Motors Corporation, Detroit, Mich.

[21] Appl. No.: 550,365

[22] Filed: Nov. 10, 1983

[51] Int. Cl.³ .............................................. H02H 7/18
[52] U.S. Cl. ...................... 361/92; 361/110; 320/13; 320/48; 340/636; 340/663; 307/10 BP
[58] Field of Search .................. 361/92, 110, 111, 88, 361/90; 320/13, 48, 39, 33, 40, 22, 32; 340/636, 663, 661, 660; 307/10 BP

[56] References Cited

U.S. PATENT DOCUMENTS

| | | | |
|---|---|---|---|
| 3,395,288 | 7/1968 | Von Brimer | 307/10 BP |
| 3,447,060 | 5/1969 | Tedd | 320/48 |
| 3,462,647 | 8/1969 | Russell | 361/92 |
| 3,474,296 | 10/1969 | Rickey | 361/92 |
| 3,522,481 | 8/1970 | Terzic | 361/92 |
| 3,543,043 | 11/1970 | Dunn | 307/18 |
| 3,568,175 | 3/1971 | Schwehr | 320/48 X |
| 3,623,131 | 11/1971 | Russell | 361/92 X |
| 3,646,354 | 2/1972 | Von Brimer | 361/92 X |
| 3,723,752 | 3/1973 | Russell | 307/10 BP |
| 3,784,892 | 1/1974 | Zelina | 320/40 |
| 3,979,657 | 9/1976 | Yorksie | 320/13 |
| 4,025,916 | 5/1977 | Arnold et al. | 320/48 X |
| 4,086,525 | 4/1978 | Ibsen et al. | 320/33 |
| 4,088,940 | 5/1978 | Ciarniello et al. | 307/10 BP X |
| 4,132,942 | 1/1979 | Yamamoto | 307/10 BP X |
| 4,137,557 | 1/1979 | Ciarniello et al. | 307/10 BP X |
| 4,149,093 | 4/1979 | D'Alessio et al. | 307/10 BP |
| 4,218,717 | 8/1980 | Shuster | 361/79 |
| 4,342,953 | 8/1982 | Collins | 307/10 BP X |

Primary Examiner—Patrick R. Salce
Attorney, Agent, or Firm—Mark A. Navarre

[57] ABSTRACT

A system responsive to the voltage of a motor vehicle battery when the vehicle engine is not running operates to disconnect the battery from the vehicle electrical loads prior to the point at which the battery becomes too discharged to restart the vehicle engine. The apparatus which operates to disconnect the battery from the loads is inhibited if an abrupt battery voltage drop indicative of vehicle entry is sensed, and the inhibit is maintained for a timed period sufficiently long in duration to allow entry of the vehicle and starting of the engine.

3 Claims, 1 Drawing Figure

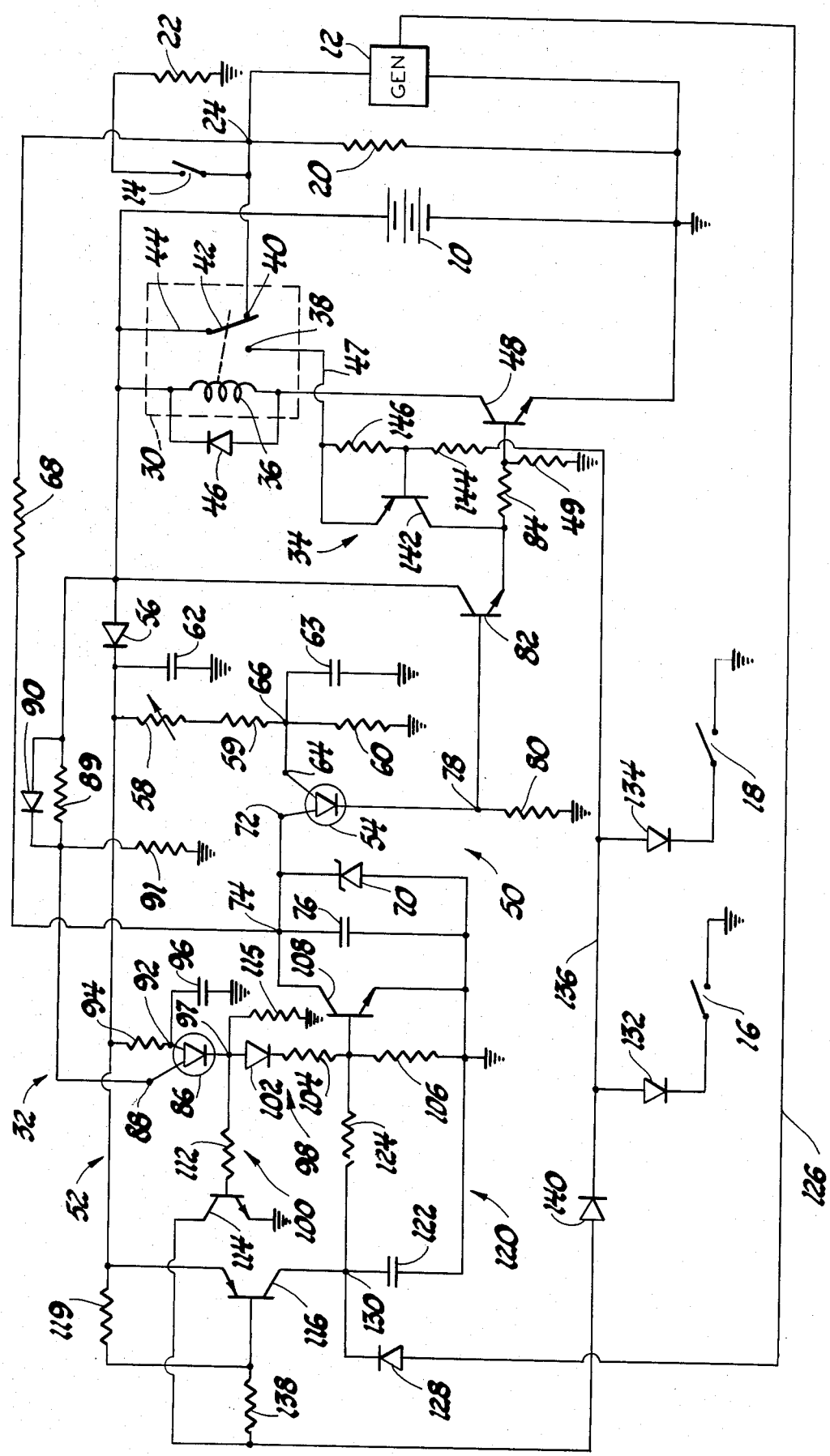

MOTOR VEHICLE BATTERY RUNDOWN PROTECTION SYSTEM

This invention relates to a motor vehicle electrical system and more particularly to a battery rundown protection system effective during periods of vehicle inoperation to interrupt the supply of power to the vehicle electrical loads before the battery becomes detrimentally discharged.

Systems of the above type are generally old in the prior art, and typically operate while the engine is not running to turn off or otherwise disconnect the battery from the electrical loads if the battery voltage falls below a predetermined threshold voltage. The threshold voltage is usually chosen such that the system operates to disconnect the battery from the loads before the battery becomes too discharged to subsequently restart the vehicle engine. An example of such a system is given in the U.S. patent to Von Brimer U.S. Pat. No. 3,395,288 issued July 30, 1968.

In the course of developing a battery rundown protection system, we have discovered a shortcoming of the prior art systems. While such systems properly disconnect the battery from the loads before the battery becomes severely discharged, they also tend to improperly disconnect the battery from the loads in response to battery voltage drops incident to the operator's entry of the vehicle. The entry-incident voltage drops are due to energization of various electrical loads such as courtesy lamps and electric door locks. Such improper disconnection is a source of annoyance and inconvenience to the operator of the vehicle since the system must be reset to reconnect the vehicle battery before load operation may be resumed. Moreover, such improper disconnection poses a particular problem for electrical loads which are designed to be continuously powered, such as semiconductor "keep alive" memories. Such memories store various predetermined and learned operating parameters for enhancing the motor vehicle operation, and the information stored therein is lost when the supply of power thereto is interrupted. The loss of such information is tolerable if the power disconnection is required to enable restarting of the vehicle engine, but is intolerable if the power disconnection is unnecessary. Although the system may be made less sensitive to entry-incident voltage drops by decreasing the threshold voltage, battery discharging due to low current drain continuously powered electrical loads may go undetected and the battery may become too discharged to restart the vehicle engine.

Accordingly, it is an object of this invention to provide an improved motor vehicle battery rundown protection system wherein supply of power to the vehicular electrical loads is interrupted when the battery voltage falls below a threshold voltage and wherein battery voltage drops incident to entry of the vehicle do not result in an unnecessary interruption of power to the electrical loads.

It is a further object of this invention to provide an improved battery rundown protection system of the above type wherein a protective circuit senses the battery voltage and operates following a time delay initiated when the battery voltage falls below a threshold voltage to disconnect the battery from the electrical loads, and wherein an override circuit senses an abrupt drop in the battery voltage indicative of the vehicle entry and operates to inhibit the operation of the protective circuit for a timed period sufficient in duration to enable entry of the vehicle and starting of the vehicle engine.

These objects are carried forward with a control unit that includes two separate voltage responsive circuits—a protective circuit and an override circuit. The protective circuit senses the battery voltage through a resistor-capacitor (RC) circuit and compares such voltage to a threshold or reference voltage determined in relation to the nominal current drain of the continuously powered electric loads such that if the battery voltage falls substantially below the threshold voltage, the energy remaining in the battery may be insufficient to restart the vehicle engine. When the sensed voltage falls to the threshold voltage, the protective circuit electrically isolates the battery from the electrical load to thereby interrupt discharging of the battery before the battery is too discharged to restart the vehicle engine. The RC circuit establishes a delay between the moment when the battery voltage falls below the threshold voltage and the moment when the protective circuit operates to disconnect the battery from the electrical load.

The override circuit senses the battery voltage through a further RC circuit and compares such voltage to the instantaneous battery voltage. The time constant of the further RC circuit determines the sensitivity of the override circuit and is designed such that the override circuit inhibits the operation of the protective circuit in response to a battery voltage drop which is indicative of vehicle entry. When triggered into operation by such an abrupt battery voltage drop, the override circuitry inhibits the operation of the protective circuit for a timed period which is sufficiently long in duration to enable entry of the vehicle and starting of the engine so that the battery voltage drops incident thereto do not result in an interruption in the supply of power to the electrical loads.

The single drawing FIGURE is a diagram of the battery rundown protection circuit of this invention. Several elements of a conventional motor vehicle electrical system are also shown in the FIGURE, including a storage battery 10, an engine-driven electrical generator 12, an ignition switch 14 which closes when the ignition key is shifted to the ON position, a crank switch 16 which closes when the ignition key is shifted to the engine cranking position, and a theft deterrent switch 18 which closes when a vehicle break-in is sensed.

The various electrical loads of the vehicle (excluding the battery rundown circuit of this invention) are lumped into two groups, designated by the reference numerals 20 and 22. The reference numeral 20 designates those loads which are designed to be continuously powered and those which may be powered through a separate switch (not shown) when the ignition key is in the OFF position; such loads are connected directly to the output terminal 24 of generator 12. The reference numeral 22 designates those electrical loads which may only be powered when the ignition key is in the ON position; such loads are connected to the output terminal 24 of generator 12 through ignition switch 14.

The battery rundown protection circuit of this invention comprises a latching relay 30 actuable to connect or disconnect the storage battery 10 and the electrical loads 20 and 22, voltage sensing circuitry 32 for actuating the relay 30 to disconnect the battery 10 from the electrical loads 20 and 22 if the battery 10 is discharged beyond a predetermined level while the vehicle engine is not running, and reset circuitry 34 operative following actuation of the relay 30 by the voltage sensing circuitry 32 for actuating the relay 30 to reconnect the battery 10 to the loads 20 and 22 when the ignition key is shifted to the crank position.

The latching relay 30 comprises an electrical coil 36, a pair of contacts 38 and 40, and a switch arm 42 which pivots about a point on line 44 for forming a conductive path between line 44 and either of the contacts 38 and 40. Momentary energization of electrical coil 36 operates to shift the switch arm 42 from one of its two positions to the other and the relay 30 includes a latching mechanism (not shown) for holding the switch arm 42 in the new position. An example of a latching relay meeting the above described specifications is the Model No. S-90R latching relay manufactured by Potter Brumfield Corporation. A diode 46 is connected across the relay electrical coil 36 to circulate inductive energy stored therein after the relay is momentarily energized to shift the position of switch arm 42. When the switch arm 42 is shifted to the position shown in the FIGURE, the battery 10 is connected to the electrical loads 20 and 22 through line 44, switch arm 42 and contact 40. When switch arm 42 is shifted into engagement with the contact 38, the battery 10 is disconnected from electrical loads 20 and 22 and is instead connected to the reset circuitry 34 via line 47. One terminal of the relay electrical coil 36 is connected to the positive terminal of battery 10 and the other is connected through the collector-emitter circuit of transistor 48 to the negative terminal of battery 10. As will be later explained, the voltage sensing circuitry 32 and the reset circuitry 34 control the conduction of transistor 48 to thereby actuate relay 30 for connecting or disconnecting the vehicle battery 10 and the electrical loads 20 and 22. Resistor 49 maintains transistor 48 in its normal nonconductive state.

The voltage sensing circuitry 32 may be divided into two subcircuits: a protective circuit 50 and an override circuit 52. The protective circuit 50 includes a programmable unijunction transistor (PUT) 54 for sensing the terminal voltage of battery 10, for comparing it to a threshold or reference voltage, and for momentarily biasing transistor 48 to a conductive state to disconnect battery 10 from the electrical loads 20 and 22 when the sensed battery voltage falls below the threshold voltage. The battery voltage is sensed through a diode 56 and an RC circuit comprising resistors 58-60 and capacitors 62-63. The gate terminal 64 of PUT 54 is connected to a terminal 66 between resistors 59 and 60. The threshold voltage is defined by a series circuit comprising resistor 68 and zener diode 70 connected between the relay contact 40 and ground potential and is present only when relay switch arm 42 is in the position shown in the FIGURE connecting battery 10 to electrical loads 20 and 22. The anode terminal 72 of PUT 54 is connected to a junction 74 between resistor 68 and zener diode 70 for sensing the threshold voltage. A capacitor 76 is connected across zener diode 70 and is charged up to the zener voltage through resistor 68. The cathode terminal 78 of PUT 54 is connected through resistor 80 to ground potential. When the battery voltage sensed at the PUT gate terminal 64 falls below the threshold voltage at the PUT anode terminal 72, the anode-cathode circuit of PUT 54 becomes conductive and capacitor 76 is discharged through resistor 80. At such point, the voltage at the PUT cathode terminal 78 abruptly increases momentarily biasing transistor 82 into conduction. Transistor 82, in turn, momentarily biases transistor 48 into conduction through resistor 84, thereby momentarily energizing the electrical coil 36 of relay 30 to shift switch arm 42 into engagement with contact 38 to disconnect battery 10 from the electrical loads 20 and 22. At such point, relay contact 40 is no longer connected to the vehicle battery 10 and the threshold voltage at the PUT anode terminal 72 remains at a relatively low value so that PUT 54 is biased nonconductive.

The threshold voltage, and hence the breakdown voltage of zener diode 70 is chosen in relation to the current drain of the continuously powered electrical loads such that PUT 54 becomes conductive to disconnect the battery 10 before it becomes too discharged to restart the vehicle engine.

The RC circuit comprising resistors 58-60 and capacitors 62-63 establishes a delay between the voltage at the positive terminal of battery 10 and the voltage at the PUT gate terminal 64. As such, the RC circuit produces a time delay between the point at which the actual battery voltage falls below the threshold voltage and the point at which PUT 54 becomes conductive to disconnect the vehicle battery 10 from the electrical loads 20 and 22. Such time delay may be adjusted as indicated in the drawing by adjusting the resistance of resistor 58.

The override circuit 52 senses drops in the battery voltage and inhibits the operation of the protective circuit 50 for a timed period upon sensing a battery voltage drop which is indicative of vehicle entry. In this way, the battery voltage drops incident to entry of the vehicle do not result in disconnection of the battery 10 from the electrical loads 20 and 22. The battery 10 is only disconnected from the loads 20 and 22 if the battery voltage gradually approaches and falls below the threshold voltage defined by resistor 68 and zener diode 70. The entry-incident battery voltage drops are detected by PUT 86. The PUT gate terminal 88 is connected through resistor 89 to the positive terminal of battery 10. Diode 90 and resistor 91 serve to limit the voltage drop across resistor 89 to about 0.7 volt. The PUT anode terminal 92 is connected to the positive terminal of battery 10 through an RC network comprising resistor 94 and capacitors 96 and 62. As a result, the voltage applied to PUT anode terminal 92 lags the voltage applied to the PUT gate terminal 88 by an amount determined by the time constant of the above-mentioned RC elements. To bias PUT 86 to its conductive state, the voltage applied to its gate terminal 88 must fall at least one diode drop lower than the voltage applied to its anode terminal 92. As such, the PUT 86 is only responsive to battery voltage drops and only to those voltage drops which are sufficiently abrupt to cause the gate terminal voltage to fall at least one diode drop below anode terminal voltage.

The RC elements referred to above determine the amount by which the anode voltage lags the actual battery voltage, and such elements are designed so that the PUT 86 only becomes conductive in response to a battery voltage drop that is large enough to be indicative of vehicle entry. An example of a voltage drop due to vehicle entry would be the voltage drop associated with energization of the electric door locks or the courtesy lamps. The diode 56 maintains the voltage differential between the PUT anode and gate terminals 92 and 88. The cathode terminal 97 of PUT 86 is connected through first and second circuit paths 98 and 100 to ground potential. The first circuit path 98 comprises diode 102, resistors 104 and 106, and the base-emitter circuit of transistor 108; the second circuit path comprises resistor 112, and the base-emitter circuit of transistor 114. Resistor 115 biases transistor 114 to its nonconductive state. When the battery voltage experiences a sufficient drop to bias PUT 86 conductive, capacitor 96 is discharged through the anode-cathode circuit thereof through the first and second circuit paths 98 and 100, thereby biasing transistors 108 and 114 into conduction. Consequently, capacitor 76 of protective circuit 50 is discharged to nearly ground potential through the collector-emitter circuit of transistor 108 to thereby inhibit the operation of PUT 54. In addition, transistor 114 biases transistor 116 into conduction through resistor 138, to thereby charge an RC hold circuit designated generally by the reference numeral 120. Transistor 116 is normally maintained nonconductive by resistor 119. The RC hold circuit 120 comprises capacitor 122 and resistors 124 and 106 and serves to maintain transistor 108 in its conductive state for a predetermined time following the biasing conductive of PUT 86. Such predetermined time is determined by the time constant of resistors 106 and 124 and capacitor 122 and such elements are designed so that transistor 108 remains conductive to inhibit the operation of PUT 54 for a period of time sufficient to allow the operator to enter the vehicle and start the vehicle engine. According to the preferred embodiment, the time delay is approximately three minutes in duration.

The RC hold circuit 120 is also charged whenever the vehicle engine is running. In the illustrated embodiment, an engine running signal is obtained from the engine driven generator 12. In installations where the engine driven generator does not provide an engine running signal, a tachometer or engine oil pressure switch may be used. In the illustrated embodiment, the engine running signal is maintained at approximately battery voltage while the engine is running, and such signal is directed via line 126 and diode 128 to the terminal 130 between capacitor 122 and the collector of transistor 116. Accordingly, the RC hold circuit 120 is maintained in the charged condition to inhibit operation of the protective circuit 50 so long as the engine is running.

Transistor 116 of the override circuitry 52 may also be biased into conduction by closure of the crank switch 16 or the theft deterrent switch 18. The crank switch 16 and theft switch 18 are connected through diodes 132 and 134 to line 136 which in turn is connected through resistor 138 and diode 140 to the base terminal of transistor 116. As a result, the operation of the protective circuit 50 is inhibited for a time period of approximately three minutes each time the crank switch 16 or theft deterrent switch 18 is closed.

The reset circuitry 34 is operable only when the relay switch arm 42 is shifted into engagement with relay contact 38, disconnecting battery 10 from the electrical loads 20 and 22. Under such conditions the relay circuitry 34 may be actuated by crank switch 16 or the theft deterrent switch 18 to momentarily energize the relay electrical coil 36 for shifting the relay switch arm 42 into engagement with contact 40 for connecting the battery 10 to the electrical loads 20 and 22. The diode 140 in line 136 prevents actuation of the reset circuitry 34 when transistor 114 of the override circuitry 52 is biased conductive. The reset function of reset circuitry 34 is performed by transistor 142 which is biased into conduction through resistor 144 when the crank switch 16 and/or the theft deterrent switch 18 is closed. Resistor 146 normally maintains the transistor 142 in its nonconductive state. When transistor 142 becomes conductive, transistor 48 in turn becomes conductive and the relay electrical coil 36 is energized to shift switch arm 42 out of engagement with contact 38 and into engagement with contact 40. At such time, transistor 142 becomes nonconductive and resistor 49 returns transistor 48 to its normal nonconductive state.

The operation of the battery rundown protection circuitry of this invention will now be described. When the motor vehicle engine is running, the relay switch arm 42 is in the position shown in the drawing thereby connecting the storage battery 10 in parallel with the generator 12 and the electrical loads 20. Due to the closure of ignition switch 14, the battery 10 and the generator 12 are also connected in parallel with the electrical loads 22. In such configuration, the generator 12 supplies power to the electrical loads 20 and 22, and charges battery 10 through the latching relay 30. Although the battery is connected to the protective circuit 50, the engine running signal on line 126 serves to prevent the protective circuit 50 from changing the position of relay switch arm 42. Specifically, the engine running signal on line 126 biases transistor 108 into conduction which, in turn, maintains the anode terminal 72 of PUT 54 at a relatively low voltage so that PUT 54 cannot be triggered into conduction.

When the vehicle engine is no longer running, the engine running signal on line 126 disappears and after a three minute time delay interposed by RC hold circuit 120, transistor 108 becomes nonconductive and capacitor 76 charges up to the zener voltage of zener diode 70 through resistor 68. At such point, the protective circuit 50 is operational and PUT 54 compares the threshold voltage at terminal 74 to the filtered battery voltage at terminal 66. The three minute time delay of RC hold circuit 120 is sufficiently long to permit the operator to leave the vehicle so that voltage drops incident thereto (courtesy lamps, electric door locks, etc.) do not result in actuation of the protective circuit 50.

When the vehicle is parked for a very long period of time, the battery current drain due to energization of the electrical loads which are designed to be continuously powered, results in a gradual reduction of the battery voltage. Since the battery voltage reduction is gradual, the voltage at the gate terminal 88 of PUT 86 fails to fall significantly below the voltage at the anode terminal 92, and PUT 86 remains nonconductive.

Sometime prior to the point at which such current drain so discharges the battery 10 that it is unable to restart the vehicle engine, the voltage sensed at terminal 66 falls below the threshold voltage defined by zener diode 70. At such point, the PUT 54 becomes conductive and capacitor 76 discharges through resistor 80 to momentarily bias transistors 82 and 48 into conduction. As a result, relay electrical coil 36 is momentarily energized and relay switch arm 42 is shifted out of engagement with contact 40 to disconnect battery 10 from electrical loads 20 and 22. Although such disconnection results in the loss of information stored in "keep alive" semiconductor memories, further discharge of the battery is prevented to enable restarting of the vehicle engine. Actuation of relay 30 also serves to commutate PUT 54 and to prevent further charging of capacitor 76.

Of course, the protective circuit 50 will also disconnect the battery 10 from the electrical loads 20 and 22 if necessary when the operator inadvertently leaves the headlamps or other electrical load energized after the engine has stopped running. However, the value of the threshold voltage is determined in relation to the current drain of the continuously powered loads since their current drain is capable of discharging the battery without drastically reducing its terminal voltage.

The shifting of relay switch arm 42 into engagement with contact 38 "arms" reset circuitry 34 so that subsequent closure of crank switch 16 or theft deterrent switch 18 results in reconnection of battery 10 to electrical loads 20 and 22. As indicated above, the theft deterrent switch 18 closes in response to a sensed vehicle break-in. If separate circuitry is required to sense the break-in, such circuitry should be continuously powered, independent of protective circuit 50. If the crank and/or theft deterrent switches 16, 18 are closed, transistors 142 and 48 become conductive to energize relay coil 36 and transistor 116 becomes conductive to charge the RC hold circuit 120. As a result, the battery 10 is reconnected to electrical loads 20 and 22, and operation of protective circuit 50 is inhibited. If a break-in is sensed, theft deterrent switch 18 remains closed so that an electrically operated alarm may be sounded for a long period of time without interruption. Closure of the crank switch 16, on the other hand, is only momentary; after the subsequent opening thereof, protective circuit 50 remains inhibited only for a timed period determined by RC hold circuit 120. Once the engine is running, the engine running signal on line 124 maintains the inhibit of protective circuit 50 as described above.

When the vehicle is parked for normal periods of time, the battery current drain due to the electrical loads which are designed to be continuously powered is insufficient to discharge the battery 10 to the point where the vehicle engine cannot be restarted, assuming that battery 10 is in good condition. Accordingly, the filtered battery voltage at terminal 66 stays above the threshold voltage and PUT 54 remains nonconductive. However, when the operator reenters the vehicle, the battery 10 may experience one or more abrupt voltage drops due to energization of the vehicle courtesy lamps or electric door locks. Depending on the state of charge of battery 10, such entry-incident voltage drops may be sufficient to cause the battery voltage to fall below the threshold voltage defined by zener diode 70. However, such entry-incident voltage drops are also sufficient to cause the voltage at the gate terminal 88 of PUT 86 to fall at least one diode drop below the voltage at the anode terminal 92, thereby biasing PUT 86 into conduction. At such point, transistors 108, 114 and 116 are momentarily biased into conduction to disable the protective circuit 50 for a timed period determined by the time constant of RC hold circuit 120. The battery voltage RC filtering elements 58–63 slows the response of protective circuit 50, and the faster responding override circuit 52 inhibits the operation of PUT 54 before the voltage at terminal 66 falls below the threshold voltage. After PUT 86 ceases to conduct, the RC hold circuit keeps transistor 108 conductive to thereby maintain the protective circuit inhibit for a time period (three minutes) sufficiently long to enable the operator to enter the vehicle and shift the ignition key to the crank position. As such, the entry-incident voltage drops are ineffective to cause disconnection of the battery from the electrical loads, and information stored in "keep alive" memories is retained. When the crank switch 16 is closed, transistor 116 becomes conductive to recharge the RC hold circuit 120 to extend the protective circuit inhibit. Once the engine is running, the engine running signal on line 126 maintains the protective circuit inhibit by keeping capacitor 122 of RC hold circuit 120 charged.

The elements described above cooperate to provide a battery rundown protection system which avoids the shortcomings of prior art systems. The system of this invention is sufficiently sensitive to protect the battery from serious discharge due to energization of low current drain continuously powered electrical loads yet is ineffective to interrupt the supply of power to such loads in response to battery voltage drops which are incident to entry of the vehicle.

While this invention has been described in reference to the illustrated embodiment, it will be understood that various modifications thereto will occur to those skilled in the art and that such modifications may fall within the scope of this invention, which is defined by the appended claims.

The embodiments of the invention in which an exclusive property or privilege is claimed are defined as follows:

1. In a motor vehicle electrical system including an electrical load and a battery for supplying power to such load when the vehicle engine is not running, apparatus comprising:

a switching mechanism trippable to interrupt the supply of power from said battery to said electrical load;

means defining a reference battery voltage determined in relation to the nominal current drain of said electrical load such that if the actual battery voltage falls significantly below such reference voltage, the energy remaining in the battery may be insufficient to restart the vehicle engine;

protective means responsive to the actual battery voltage and operative following a time delay which is initiated when the actual battery voltage falls below said reference battery voltage for tripping said switching mechanism thereby to interrupt the supply of power to said load before the battery is too discharged to restart the vehicle engine; and override means responsive to an abrupt drop in the actual battery voltage indicative of vehicle entry for inhibiting the operation of said protective means for a timed period sufficiently long in duration to enable entry of the vehicle and starting of the engine so that battery voltage drops incident to entry of the vehicle do not result in interruption of the supply of power to the electrical load.

2. In a motor vehicle electrical system including an electrical load and a battery for supplying power to such load when the vehicle engine is not running, apparatus comprising:

a switching mechanism trippable to interrupt the supply of power from said battery to said electrical load;

means defining a reference battery voltage determined in relation to the nominal current drain of said electrical load such that if the actual battery voltage falls significantly below such reference voltage, the energy remaining in the battery may be insufficient to restart the vehicle engine;

protective means responsive to the actual battery voltage and operative following a time delay which is initiated when the actual battery voltage falls below said reference battery voltage for tripping said switching mechanism thereby to interrupt the supply of power to said load before the battery is too discharged to restart the vehicle engine;

hold means effective when enabled to inhibit the operation of said protective circuit for a timed period sufficiently long in duration to enable entry of the vehicle and starting of the engine; and transient detecting means responsive to an abrupt drop in the actual battery voltage indicative of vehicle entry for enabling said hold means to thereby prevent said protective means from interrupting the supply of power to said load in response to voltage drops incident to entry of the vehicle.

3. In a motor vehicle electrical system including an electrical load, a battery for supplying power to such load when the vehicle engine is not running, and a crank switch actuated when the operator of the vehicle attempts to start the vehicle engine, apparatus comprising:

a switching mechanism trippable to disconnect the battery from said electrical load, thereby interrupting the supply of power thereto;

means defining a reference battery voltage determined in relation to the nominal current drain of said electrical load such that if the actual battery voltage falls significantly below such reference voltage, the energy remaining in the battery may be insufficient to restart the vehicle engine;

protective means responsive to the actual battery voltage and operative following a time delay which is initiated when the actual battery voltage falls below said reference battery voltage for tripping said switching mechanism thereby to interrupt the supply of power to said load before the battery is too discharged to restart the vehicle engine;

hold means effective when enabled to inhibit the operation of said protective circuit for a timed period sufficiently long in duration to enable entry of the vehicle and starting of the engine;

transient detecting means responsive to an abrupt drop in the actual battery voltage indicative of vehicle entry for enabling said hold means to thereby prevent the protective circuit from interrupting the supply of power to the load in response to voltage drops incident to entry of the vehicle;

reset means enableable after the switching mechanism has been tripped to reset the switching mechanism thereby to reconnect the battery to the electrical load; and means responsive to actuation of the crank switch for enabling said hold means and said reset means.

* * * * *